United States Patent
Schedgick

(10) Patent No.: US 9,026,318 B2
(45) Date of Patent: May 5, 2015

(54) PASSIVE LOAD AND ACTIVE VELOCITY BASED FLOW COMPENSATION FOR A HYDRAULIC TRACTOR HITCH

(71) Applicant: HUSCO International, Inc., Waukesha, WI (US)

(72) Inventor: David J. Schedgick, Menasha, WI (US)

(73) Assignee: HUSCO International, Inc., Waukesha, WI (US)

(\*) Notice: Subject to any disclaimer, the term of this patent is extended or adjusted under 35 U.S.C. 154(b) by 94 days.

(21) Appl. No.: 13/959,186

(22) Filed: Aug. 5, 2013

(65) Prior Publication Data

US 2015/0039188 A1 Feb. 5, 2015

(51) Int. Cl.
 *G06F 19/00* (2011.01)
 *A01B 63/14* (2006.01)
 *A01B 63/112* (2006.01)

(52) U.S. Cl.
 CPC .................................. *A01B 63/112* (2013.01)

(58) Field of Classification Search
 CPC .. B62D 13/005; B62D 53/0857; A01B 63/22; A01B 63/112; A01B 63/002; A01B 63/1117; A01B 59/042; A01B 63/1006; A01B 79/005; A01B 59/04; A01B 59/065; A01B 59/067; A01B 59/068; A01B 63/11; A01B 63/145; B60D 1/065

USPC ........... 701/40, 50, 42, 49; 702/159; 348/113; 280/405.1; 180/14.4; 172/319–331, 172/396, 439–445, 467, 588, 678
See application file for complete search history.

(56) References Cited

U.S. PATENT DOCUMENTS

| | | |
|---|---|---|
| 5,320,186 A | 6/1994 | Strosser et al. |
| 6,233,511 B1 | 5/2001 | Berger et al. |
| 6,257,118 B1 | 7/2001 | Wilbur et al. |
| 6,282,891 B1 | 9/2001 | Rockwood |
| 6,612,375 B2 | 9/2003 | Rogala |
| 6,698,523 B2 | 3/2004 | Barber |
| 7,434,392 B2 | 10/2008 | Barber |
| 8,406,966 B2 | 3/2013 | Schedgick et al. |
| 2012/0180878 A1\* | 7/2012 | Greenwood et al. .......... 137/488 |
| 2012/0185137 A1\* | 7/2012 | Schedgick et al. .............. 701/49 |

\* cited by examiner

*Primary Examiner* — Muhammad Shafi
(74) *Attorney, Agent, or Firm* — Quarles & Brady LLP

(57) ABSTRACT

A hitch on a vehicle is raised and lowered by a hydraulic actuator controlled by an electrically operated valve. A control system receives a command that indicates a designated velocity and uses the command to operate the valve. Based on a reference external force exerted on the hitch, the control system is configured with relationships for converting a plurality of command values to corresponding electric current levels for operating the valve. The control system compensates for effects due to differences between the actual force acting on the hitch and the reference external force. Velocity feedback adjusts the electric current level applied to the valve. The passive load force control provides a predictor of the hitch load force to eliminate overshoot/undershoot of hitch motion. During hitch motion, the velocity feedback also compensates for effects due to load and hitch geometry changes that occur.

21 Claims, 2 Drawing Sheets

PASSIVE LOAD AND ACTIVE VELOCITY BASED FLOW COMPENSATION FOR A HYDRAULIC TRACTOR HITCH

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to earth-working equipment, such as an agricultural implement pulled by a tractor; and more particularly to a method for controlling a hydraulic system that operates a hitch that couples the implement to the tractor.

2. Description of the Related Art

A variety of agricultural implements are available to be pulled by a tractor for working earth in a farm field in which crops will be or have been planted. The implement is connected to a standard three-point hitch with right and left drag links on the rear of the tractor and the hitch can be operated to raise and lower the implement. The hitch is raised and lowered hydraulically by piston-cylinder assembly that is operated by a valve that controls the flow of fluid to and from the piston-cylinder assembly.

A conventional tractor has a control panel by which the operator sets desired upper and lower positions for the hitch and a desired velocity at which the hitch should travel up and down. The operator then activates an input device to select raising or lowering the hitch. An electronic control system responds to that switch by operating an electrohydraulic valve to drive the piston-cylinder assembly so that the hitch moves in the designated direction and speed until the hitch reaches the selected position at which time the valve is closed. Specifically the electronic control system applies a given level of electric current to the electrohydraulic valve which opens the valve a corresponding degree thereby providing a related amount of fluid flow through the valve.

Electrohydraulic hitch valves typically have been designed with a mechanical flow compensator on the raise function. The flow compensator provides a constant flow rate (raise rate) at a given valve current regardless of the load on the hitch arms and regardless of other pressure demands of the hydraulic system. Flow compensation usually is not implemented on lower function of the hitch valve. This results in variable lowering rates for a given valve current. The lower rate varies due to different loads being placed on the hitch, as well as due to changes in hitch geometry as the hitch arms change position. The use of a mechanical flow compensation technique similar to that used during raise could provide a constant lowering rate for a given valve current, but doing so would add cost and complexity to the valve assembly.

As a consequence, there is a need for a hydraulic control system that provides flow compensation during both raise and lower operations.

SUMMARY OF THE INVENTION

A vehicle, such as a farm tractor, for example, has a hitch for towing an implement that can be raised and lowered by movement of the hitch. The hitch is moved by operating a valve to control the flow of fluid to and from a hydraulic actuator which is mechanically coupled to the hitch.

To operate the hitch, a hitch command is received from a device manipulated by the tractor operator, wherein the hitch command indicates a designated velocity for the hitch. A first error value is produced that denotes deviation of the force acting on the hitch from a reference force level. For example, one or more force sensors can be attached to the hitch to detect the force acting thereon. The hitch command is altered in response to the first error value, thereby producing a first adjusted command. The hitch is moved in response to the first adjusted command.

A second value is produced that relates to an actual velocity at which the hitch is moving. For example, a sensor can be attached to the hitch to provide a signal from which the actual velocity can be determined. A second error value denoting deviation of the actual velocity of the hitch from the commanded hitch velocity is derived. The first adjusted command is altered in response to the second error value, thereby producing a second adjusted command. The valve then is operated in response to the second adjusted command.

One embodiment of a vehicle, that incorporates the present hitch control method, has an electrically operated valve. A control system on the vehicle converts the operator command, providing the designated velocity, into an electric current level for operating the valve. The control system is configured with relationships between a hitch motion command values and electric current levels based on a reference force level is acting on the hitch. The present method for controlling the hitch adjusts for effects that deviation of the actual exerted external force from the reference force level has on operation of the valve and the hydraulic actuator.

The use of passive load force control provides a predictor of the hitch load to eliminate the overshoot/undershoot from active control. Active velocity correction further compensates during hitch motion travel to account for any load or hitch geometry changes that occur.

DETAILED DESCRIPTION OF THE INVENTION

Figure 1:
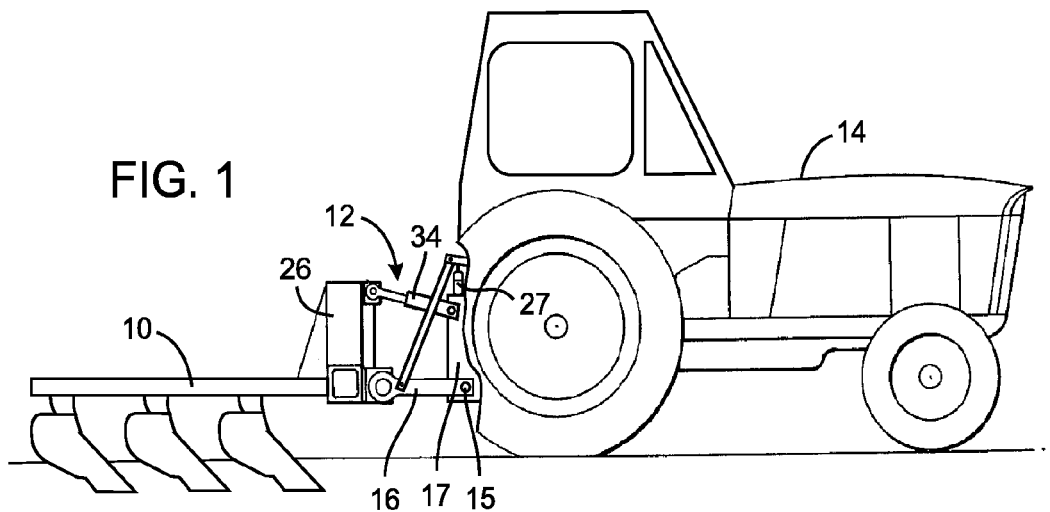
FIG. 1 illustrates a tractor pulling an agricultural implement.
Figure 2:
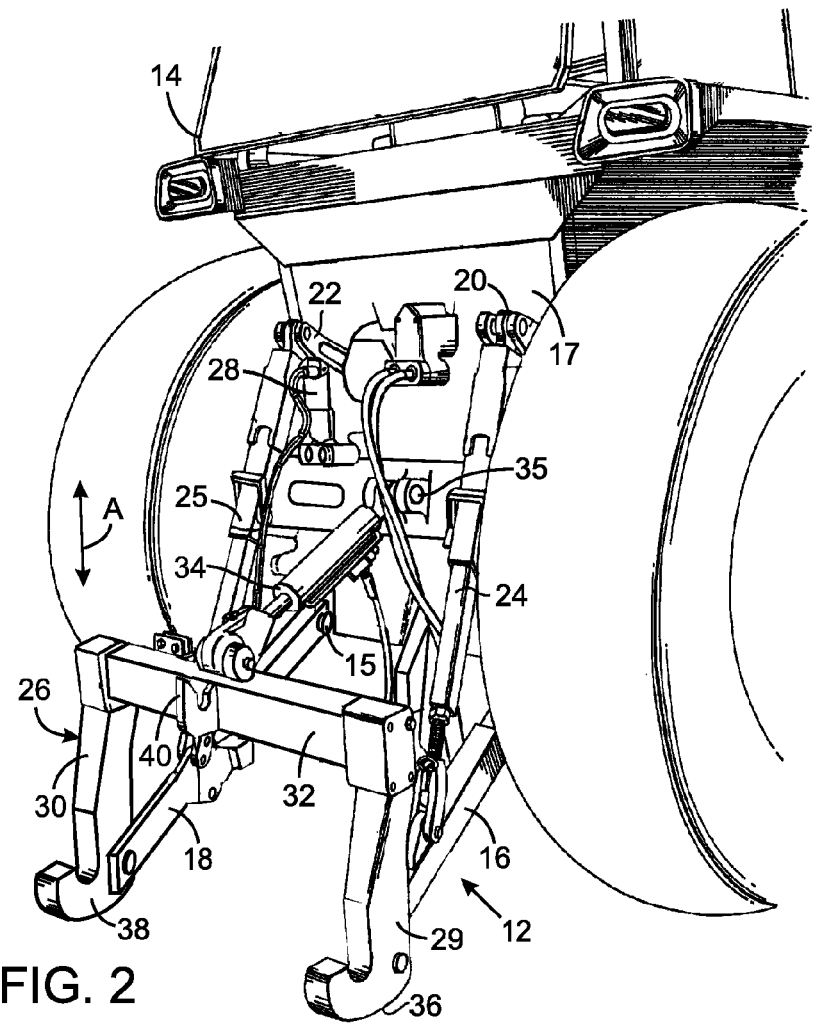
FIG. 2 shows a typical three-point hitch on the tractor for attaching the implement.

With initial reference to FIGS. 1 and 2, an implement 10, such as a multiple blade agricultural plow, is connected by a three-point hitch 12 to the rear of a tractor 14. The hitch 12 comprises right and left drag links 16 and 18, the proximal ends of which are pivotally attached to the tractor frame 17 by pins 15. A pair of lift arms 20 and 22, connected to the drag links 16 and 18 by lift links 24 and 25, control the elevation of the drag links. Two hydraulic actuators 27 and 28, in this case single acting lift hydraulic cylinders, are connected between the lift arms 20 and 22 and the tractor frame 17 to pivot the lift arms up and down with respect to that frame.

The distal ends of the drag links 16 and 18 are respectively attached to vertically extending legs 29 and 30 of a coupler 26 that has a cross bar 32 connected between the upper ends of the legs. A link hydraulic cylinder 34 is attached at one end to the cross bar 32 and at the other end to the tractor frame 17 by a pin 35. A pair of lower lift hooks 36 and 38 project rearward from the bottom ends of legs 29 and 30 and an upper lift hook 40 is positioned in the middle of a cross bar 32. The lift arms 20 and 22 move the coupler 26 bi-directionally along a principal axis "A" of coupling motion, which in this case is vertical.

The lower and upper lift hooks 36, 38 and 40 cooperate with mating parts on a hitch structure of the implement 10. Specifically the lower lift hooks 36 and 38 engage the lower hitch pins that extend laterally with respect to the frame of the implement. The implement also has a laterally extending upper hitch pin that is received in the upper lift hook 40 when the implement 10 is coupled to the tractor 14. The trio of lift hooks 36, 38 and 40 form the three points of the hitch 12.

Figure 3:
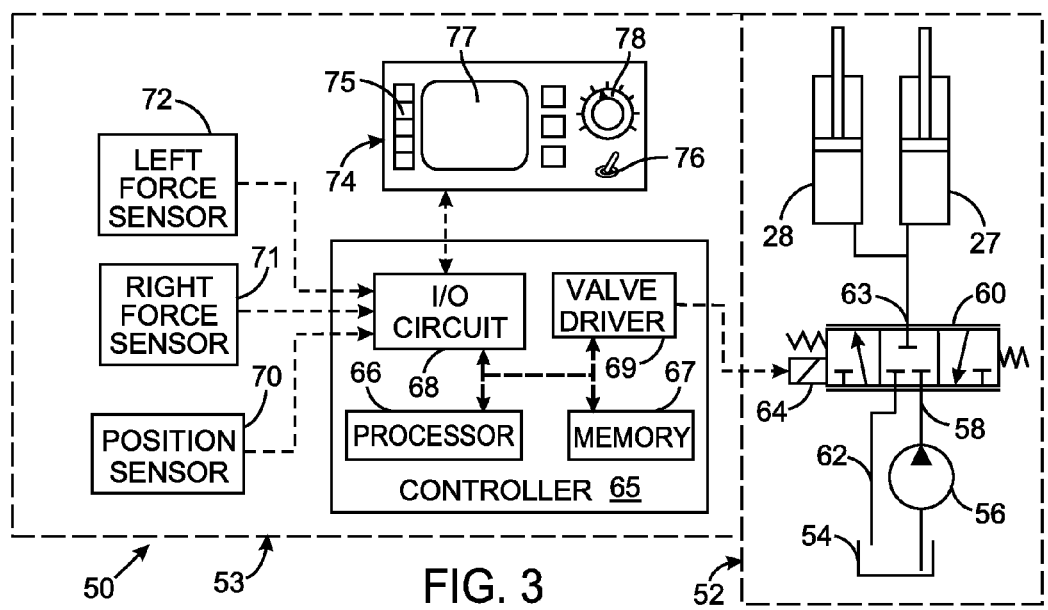
FIG. 3 is a block diagram of an electrohydraulic system for operating the three-point hitch.

With reference to FIG. 3, the electrohydraulic control system 50 for operating the three point hitch 12 comprises a hydraulic section 52 and an electronic section 53. The hydraulic section 52 includes a tank 54, which holds hydraulic fluid, and a pump 56, that when driven by the engine of the tractor 14 sends pressurized hydraulic fluid from the tank through a supply line 58. A supply line 58 is connected to a three-position, three-way electrohydraulic valve 60 and a tank return line 62 couples the valve to the tank 54. The valve 60 has a workport 63 connected to two lift hydraulic actuators 27 and 28, such as a pair of single-acting piston-cylinder assemblies having head chambers to which the workport is connected. It should be appreciated that the present flow compensation technique can be used with hydraulic sections having other configurations, such as where the valve workport 63 is connected to the cylinder rod chambers, those having only one hydraulic actuator, and those with one or two double-acting hydraulic actuators.

The valve 60 is operated by a solenoid 64 that is energized by an electric current from a controller 65 within the electronic section 53 of the control system 50. The controller 65 may be a microcomputer-based device that includes processor 66 which executes instructions of a software control program, to be described, and a memory 67 for storing the instructions and data for the control program. A valve driver 69 responds to commands from the processor 65 by producing a variable electric current level for driving the solenoid 64 to proportionally operate the electrohydraulic valve 60. The controller 65 further comprises an input/output (I/O) circuit 68 that has analog and digital ports to receive input signals from sensors and to interface with other devices on the tractor.

The input/output circuit 68 receives a signal from a position sensor 70 that indicates the vertical position of the coupler 26 of the three point hitch 12. Any of various types of sensing mechanisms located at any of several locations on the hitch can be employed. For example, the position sensor 70 may be a linear device connected to one of the lift hydraulic actuators 27 or 28 to produce a signal as the piston rod extends and contracts from the cylinder body. Alternatively, a rotational type position sensor can be connected to one of the lift arms 20 or 22 to provide a signal indicating the rotational position of that arm with respect to the tractor frame 17. With both of these sensing techniques, the signal from the position sensor 70 indicates a position that is geometrically related to the vertical position of the hitch coupler 26 with respect to the tractor frame 17.

The input/output circuit 68 also receives signals from right and left force sensors 71 and 72. For example, these sensors are standard clevis pin type sensors commonly incorporated into the pins 15 that couple the left and right drag links 16 and 18 to the tractor frame 17. The force sensors 71 and 72 detect the load force that is exerted by an implement attached to the hitch. Because that the load force results the weight of the implement due to gravity, the load force is directed downward and tends to lower the hitch 12. The present control system 50 is being described in the context of left and right sensors which have the advantage of measuring the different forces exerted on the lateral sides of the three-point hitch 12 by the implement of other apparatus attached to the hitch. Alternatively, a single clevis pin sensor can be used in the pin 35 that connects the link hydraulic cylinder 34 to the tractor frame 17. Other types of sensors, sensing locations and sensing mechanisms can be employed to produce electrical signals indicating the magnitude of the external force acting on the three point hitch 12. For example, the force acting on the hitch can be detected by sensing the hydraulic pressure produced in the hydraulic actuators 27 and 28 by that force.

A human interface 74 exchanges signals with the input/output circuit 68 of the controller 65. This enables the operator of the tractor 14 to input configuration settings and send commands to the controller, thereby defining operation of the hydraulic section 52. In particular as will be described, input switches 75 are used to select desired ultimate raised and lowered positions for the implement attached to the hitch 12. A center-off, three-position, momentary contact toggle switch 76 enables the tractor operator to indicate that the hitch 12 should be raised and lowered. Other types of switches and input devices can be employed. The human interface 74 also has a display screen 77 by which information is presented to the tractor operator.

A speed input device 78 enables the tractor operator to designate a velocity at which the hitch is to be raised and lowered. The manufacturer of the tractor 14 has determined a maximum speed for lowering the hitch 12 and different positions of the speed input device 78 indicate hitch lowering speeds within a range between a defined minimum hitch speed and that maximum speed. The maximum speed also is stored in the memory 67, as a constant reference velocity value. The signal from the speed input device 78 indicates a percentage of the maximum speed. The control system 50 is calibrated by the tractor manufacturer so that when a constant reference force level is exerted on the hitch, each speed indicated within that range causes the valve driver 69 to send an electric current level to the valve 60 so that the hydraulic actuators are driven to achieve the desired hitch velocity. Specifically, that electric current level when applied to the solenoid 64, opens the hydraulic valve 60 to produce a fluid flow there through that suitably operates the hydraulic actuators 27 and 28 to move the hitch at the designated velocity. The result of the calibration process is a set of relationships between hitch motion command values and electric current levels for properly moving the hitch when the reference force level is acting on the hitch. The memory 67 of the controller 65 stores a look-up table containing the set of relationships that will be use to convert hitch motion commands into electric current levels for operating the hydraulic valve. It should be understood that when a force other than the reference force level is exerted on the hitch, the velocity to electric current conversion is slightly inaccurate and the hitch may not move at the designated velocity.

When the operator of the tractor 14 desires to raise or lower the hitch 12, the operator moves the toggle switch 76 in one direction or the other from the center off position to indicate whether the hitch is to be raised or lowered. Assume for example that the hitch is to be lowered. Activation of the toggle switch 76 sends a hitch command that denotes the direction for hitch motion and a value indicating a desired speed as a percentage of the reference, or maximum speed. Thus that hitch command denotes a desired velocity for the hitch 12.

Figure 4:
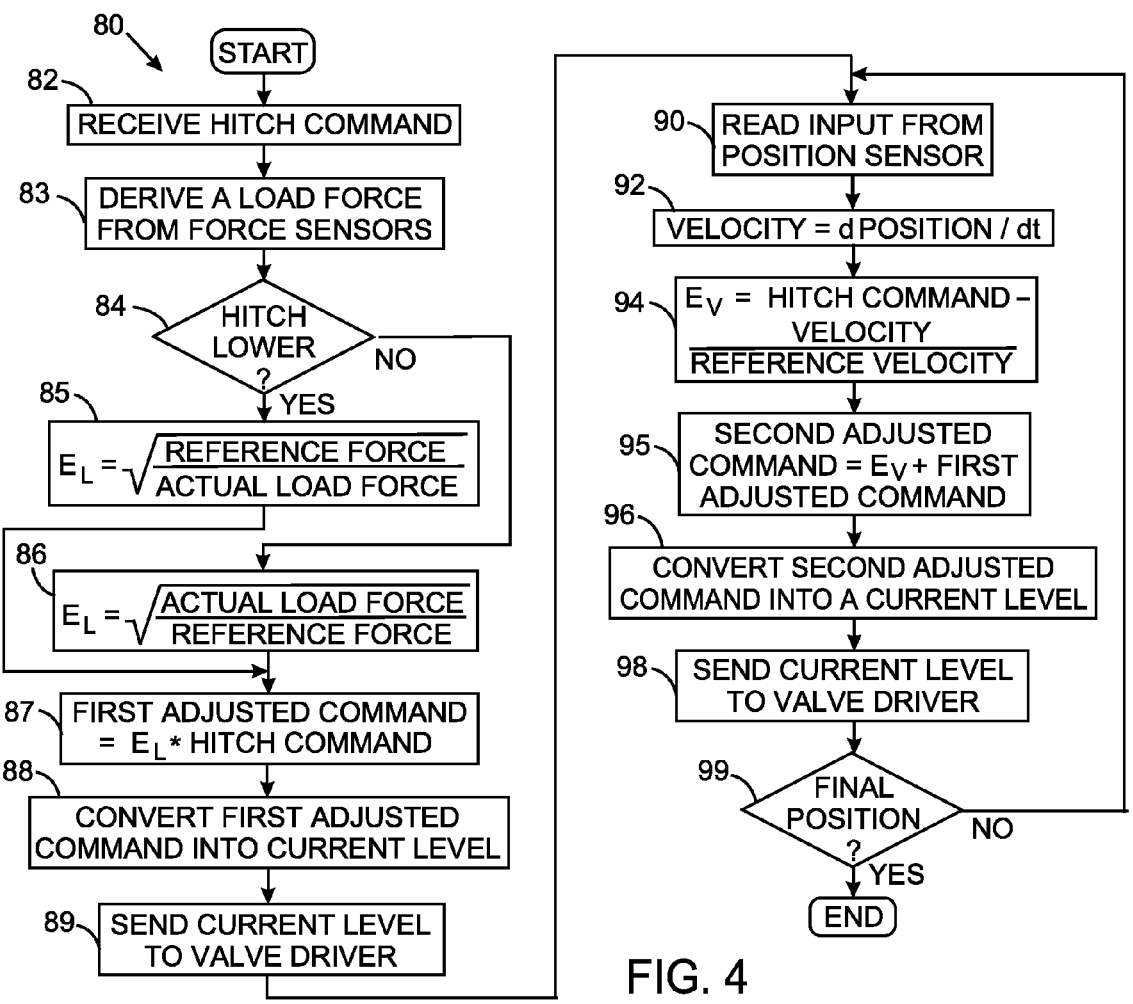
FIG. 4 is a flowchart depicting the flow compensation technique according to the present invention.

The controller 65 responds to the hitch command by executing a hitch control program 80 depicted by the flowchart in FIG. 4. The hitch control program 80 commences at step 82 by receiving the hitch command from the control panel 74. Next at step 83, the inputs from the left and right force sensors 71 and 72 are read by the controller 65 and processed to derive a net force referred to as the load force acting on the hitch 12. One previous technique for deriving a load force simply averaged the right and left forces. Another technique calculated the load force according to the expression:

Load Force=Maximum(Right Force,Left Force)+
GAIN*abs(Right Force−Left Force)

where GAIN is a predefined factor that specifies the sensitivity of the force difference.

Then at step 84, a determination is made whether the hitch command designates that the hitch should be lowered or raised and in response the program execution branches to either step 85 or 86, respectively. When the hitch 12 is lowering, the force of gravity acting on the implement 10 adds to the force from the hydraulic actuators to assist in lowering the hitch. Therefore, if the actual load force acting on the hitch is greater than a reference force level, that the manufacturer used to configure the hydraulic control system 50 and define the relationships between hitch motion command values and electric current levels, that additional force causes the hitch to lower at a faster rate than is designated by the hitch command from the operator. Similarly if the actual load force is less than that reference force level, the hitch will move downward at a slower rate than designated by the hitch command. Therefore, the present method compensates for the effects of those force differences by deriving a load error value $E_L$ based on the reference force level. In the lowering mode, the hitch control program 80 branches to step 85 where the load error value $E_L$ is the square root of the ratio of the reference force level over the actual load force derived from the force sensors 71 and 72 at step 83.

In the hitch raising mode, the effects due to the actual load force differing from the reference force level are inverted and the force of gravity acting on the implement counteracts the force from the hydraulic actuators and thus the hitch motion. Therefore, a greater actual load force than the reference force level causes the control system 50 to raise the hitch at a slower rate than desired, and a lesser actual load force than the reference force level causes the control system 50 to raise the hitch faster than the designated rate. Thus in the hitch raising mode, step 86 is executed instead of step 85 and the force ratio used to derive the load error value $E_L$ is the square root of the actual load force over the reference force level.

The load error value $E_L$ then is employed at step 87 to adjust the operator's hitch command. This is accomplished by multiplying the hitch command from the human interface 74 by the load error value $E_L$ to produce a first adjusted command. The first adjusted command has a value that is compensated for the effect that deviation of the actual load force from the reference force level has on hitch motion. The first adjusted command has a smaller value than the original hitch command when either the actual load force is greater than the reference force level in the hitch lowering mode, or the actual load force is less than the reference force level in the raising mode. In those situations, the actual load force assists the desired hitch motion and less than the calibration hydraulic force is needed to move the hitch at the designated velocity. Inversely, the first adjusted command has a larger value than the original hitch command when the actual load force either is smaller than the reference force in the hitch lowering mode, or is greater than the reference force in the raising mode. In those latter situations the actual load force counteracts the desired hitch motion and more than the calibration hydraulic force is needed to move the hitch at the designated velocity from the operator command.

At step 88 the first adjusted command is converted into an electric current level using the motion command value to electric current level relationships established during control system calibration for the given reference load force acting on the hitch. That electric current level is applied by the valve driver to the solenoid 64 of the hydraulic valve 60 at step 89. This results in a fluid flow through the hydraulic valve that drives the actuators 27 and 28 causing hitch 12 to begin moving.

Producing the first adjusted command in the manners described above results in production of an electric current level that operates the valve 60 to compensate for actual load forces that are different than the given reference load force used during calibration. Thus, when the actual load force is such that the hitch does not require as much hydraulic force to move at the desired speed, a smaller electric current level is derived using the calibrated command to electric current relationship than would be produced for the given reference load force. In response to that smaller electric current level, the valve 60 opens less to apply a lower flow rate to the hydraulic actuators 27 and 28. When the actual load force is such that the hitch requires more hydraulic force to move at the desired speed, resultant electric current level is larger and the valve 60 opens more to apply a higher flow rate to the hydraulic actuators.

The control program 80 then advances to a section that provides velocity feedback control which determines any error between the actual velocity at which the hitch 12 is moving and the desired velocity as indicated by the original hitch command. Such an error then is used to alter the first adjusted command so that the electric current applied to the hydraulic valve 60 will result in the hitch moving at the desired velocity.

This section of the control program 80 commences at step 90 at which the controller 65 reads the signal from the position sensor 70 to obtain an indication of the position of the hitch. At step 92, the derivative of the position signal is calculated to determine the actual velocity of the hitch. Other sensors and sensing techniques can be employed to detect the actual velocity of the hitch 12. Next at step 94, any difference between the actual velocity and the velocity indicated by the original hitch command is determined, thereby producing a velocity error value $E_V$. Note that the original hitch command is expressed as a percentage of the reference velocity, e.g. that maximum velocity defined by the tractor manufacturer for system configuration. Therefore, the arithmetic expression at step 94 uses a ratio of the actual velocity to that reference velocity to determine the velocity error value from the hitch command.

At step 95, the velocity error value is summed with the first adjusted command to produce a second adjusted command that indicates a command value that is necessary for the control system to produce an electric current to properly drive the valve 60 in a manner that achieves the hitch velocity desired by the tractor operator. In other words, if the actual velocity determined at step 92 is less than the desired velocity, the velocity error value $E_V$ will be positive and produces a second adjusted command that is greater than the first adjusted command. In this case, the valve will open slightly more to drive the hydraulic actuators 27 and 28 a greater amount. In the opposite case, in which the actual velocity is greater than that desired by the tractor operator, the velocity error value $E_V$ will be negative. That negative velocity error value produces a second adjusted command that is less than the first adjusted command so that the valve is closed slightly to drive the hydraulic actuators 27 and 28 less vigorously to achieve the desired hitch velocity.

The second adjusted command then is converted at step 96 into a corresponding electric current level using the calibrated hitch motion command value to electric current level relationships defined during control system configuration. The so derived electric current level then is applied to the valve driver 69 at step 98 to properly operate the valve 60 and drive the hydraulic actuators accordingly.

The control program 80 then advances to step 99 where the actual position of the hitch 12, that was sensed at step 90, is compared to the desired ultimate position as set by the tractor operator via input switches 75. If the hitch 12 has not reached the desired ultimate position, the program execution returns to step 90 for another pass through the velocity feedback section. Eventually the hitch 12 will reach the desired ultimate position at step 99 causing the control program to terminate.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:

1. A method for controlling a hitch on a vehicle, wherein the hitch is raised and lowered by a hydraulic actuator that is controlled by a valve, said method comprising using a controller for:
   receiving a command indicating a designated velocity for the hitch;
   producing a first value indicative of an external force that is exerted on the hitch;
   altering the command in response to deviation of the external force from a predefined reference force level and whether the external force assists or counteracts hitch motion designated by the command, wherein altering the command produces a first adjusted command;
   producing movement of the hitch in response to the first adjusted command;
   producing a second value indicative of an actual velocity at which the hitch is moving;
   deriving a velocity error value denoting deviation of the actual velocity of the hitch from the designated velocity;
   altering the first adjusted command in response to the velocity error value, thereby producing a second adjusted command; and
   operating the valve in response to the second adjusted command.

2. The method as recited in claim 1 wherein altering the command comprises deriving a force error value denoting deviation of the external force from a predefined reference force level, and arithmetically applying the force error value to the command.

3. The method as recited in claim 2 wherein the force error value is derived using a ratio of the external force and the predefined reference force level.

4. The method as recited in claim 1 wherein altering the command comprises adjusting the command in proportion to an amount of the deviation of the external force from the predefined reference force level, and whether the external force assists or counteracts hitch motion designated by the command.

5. The method as recited in claim 1 wherein producing movement of the hitch comprises deriving an electric current level in response to the first adjusted command; and employing the electric current level to operate the valve.

6. The method as recited in claim 1 wherein producing a second value indicative of an actual velocity comprises employing a sensor to indicate positions of the hitch during movement; and deriving the actual velocity from those positions.

7. The method as recited in claim 1 wherein altering the first adjusted command comprises summing the first adjusted command and the velocity error value.

8. The method as recited in claim 1 wherein operating the valve in response to the second adjusted command comprises deriving an electric current level in response to the second adjusted command; and employing the electric current level to operate the valve.

9. A method for controlling a hitch on a vehicle, wherein the hitch is raised and lowered by a hydraulic actuator that is controlled by a valve which is operated by electric current, said method comprising: using a controller for:
   defining relationships between commands for operating the hitch and electric current levels for controlling the valve, when a reference force level is acting on the hitch;
   receiving a command indicating a designated velocity for the hitch;
   producing a first value indicative of a hitch force resulting from an apparatus attached to the vehicle by the hitch;
   deriving a first error value denoting deviation of the hitch force from the reference force level;
   altering the command in response to the first error value, thereby producing a first adjusted command;
   using the first adjusted command and the relationships to derive a first electric current level; and
   applying the first electric current level to the valve to produce movement of the hitch.

10. The method as recited in claim 9 wherein the first error value is derived using a ratio of the hitch force and the reference force level.

11. The method as recited in claim 9 wherein altering the command comprises arithmetically applying the first error value to the command.

12. The method as recited in claim 9 wherein altering the command comprises adjusting the command in proportion to a magnitude of the deviation of the hitch force from the reference force level, and whether the hitch force assists or counteracts hitch motion designated by the command.

13. The method as recited in claim 9 further comprising:
   producing a second value indicative of an actual velocity at which the hitch is moving;
   deriving a second error value denoting deviation of the actual velocity of the hitch from the designated velocity;
   altering the first adjusted command in response to the second error value, thereby producing a second adjusted command;
   using second adjusted command and the relationships to derive a second electric current level; and
   applying the second electric current level to the valve.

14. The method as recited in claim 13 wherein producing a second value indicative of an actual velocity comprises employing a sensor to indicate positions of the hitch during movement; and deriving the actual velocity from those positions.

15. The method as recited in claim 13 wherein altering the first adjusted command comprises summing the first adjusted command and the second error value.

16. A method for controlling a hitch on a vehicle, wherein the hitch is raised and lowered by a hydraulic actuator that is controlled by a valve that is operated by electric current, said method comprise: using a controller for:
defining relationships between velocity designations for operating the hitch and electric current levels for controlling the valve when a reference force level is acting on the hitch;
receiving a command indicating a velocity designation for the hitch;
producing a first value indicative of a hitch force resulting from an apparatus attached to the vehicle by the hitch;
deriving a first error value denoting deviation of the hitch force from the reference force level;
altering the velocity designation in response to the first error value, thereby producing a first adjusted velocity designation;
using the first adjusted velocity designation and the relationships to derive a first electric current level; and
applying the first electric current level to the valve.

17. The method as recited in claim 16 wherein the first error value is derived using a ratio of the hitch force and the reference force level; and altering the velocity designation comprises arithmetically applying the ratio to the velocity designation.

18. The method as recited in claim 16 wherein altering the velocity designation comprises adjusting the velocity designation in proportion to an amount of the deviation of the hitch force from the reference force level, and whether the hitch force assists or counteracts hitch motion indicated by the velocity designation.

19. The method as recited in claim 16 further comprising:
producing a second value indicative of an actual velocity at which the hitch is moving;
deriving a second error value denoting deviation of the actual velocity of the hitch from the velocity designation;
altering the first adjusted velocity designation in response to the second error value, thereby producing a second adjusted velocity designation;
using second adjusted velocity designation and the relationships to derive a second electric current level; and
applying the second electric current level to the valve.

20. The method as recited in claim 19 wherein producing a second value indicative of an actual velocity comprises employing a sensor to indicate positions of the hitch during movement; and deriving the actual velocity from those positions.

21. The method as recited in claim 19 wherein altering the first adjusted velocity designation comprises summing the first adjusted velocity designation and the second error value.

\* \* \* \* \*

UNITED STATES PATENT AND TRADEMARK OFFICE
CERTIFICATE OF CORRECTION

PATENT NO. : 9,026,318 B2
APPLICATION NO. : 13/959186
DATED : May 5, 2015
INVENTOR(S) : David J. Schedgick Page 1 of 1

It is certified that error appears in the above-identified patent and that said Letters Patent is hereby corrected as shown below:

In the Claims

Column 9, Claim 16, Line 7, "comprise" should be --comprising--.

Signed and Sealed this
Eighteenth Day of August, 2015

Michelle K. Lee
*Director of the United States Patent and Trademark Office*